United States Patent
Cui et al.

(10) Patent No.: US 9,294,548 B2
(45) Date of Patent: Mar. 22, 2016

(54) MOBILITY HANDLING IN A COMMUNICATION NETWORK

(75) Inventors: Yong Cui, Beijing (CN); Yuri Ismailov, Kista (SE); Tianze Ma, Beijing (CN); Yonghao Sun, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 239 days.

(21) Appl. No.: 13/995,745

(22) PCT Filed: Dec. 22, 2010

(86) PCT No.: PCT/CN2010/002120
§ 371 (c)(1),
(2), (4) Date: Jun. 19, 2013

(87) PCT Pub. No.: WO2012/083495
PCT Pub. Date: Jun. 28, 2012

(65) Prior Publication Data
US 2013/0275609 A1    Oct. 17, 2013

(51) Int. Cl.
*H04L 29/08* (2006.01)
*H04W 8/08* (2009.01)
(Continued)

(52) U.S. Cl.
CPC ............ *H04L 67/06* (2013.01); *H04L 61/103* (2013.01); *H04L 61/2084* (2013.01); *H04L 69/14* (2013.01); *H04W 8/085* (2013.01); *H04L 61/1511* (2013.01); *H04L 69/24* (2013.01)

(58) Field of Classification Search
CPC .............. H04L 61/103; H04L 61/1511; H04L 61/2084; H04L 67/06; H04L 69/14; H04L 69/24; H04W 8/085
See application file for complete search history.

(56) References Cited

U.S. PATENT DOCUMENTS

| 6,819,670 B1 * | 11/2004 | Fenner ............ H03M 7/4006 370/349 |
| 2004/0122976 A1 * | 6/2004 | Dutta ............... H04W 8/082 709/245 |

(Continued)

FOREIGN PATENT DOCUMENTS

| CN | 101695160 A | 4/2010 |
| CN | 101719918 A | 6/2010 |

(Continued)

OTHER PUBLICATIONS

Ford et al., "TCP Extensions for Multipath Operation with Multiple Addresses, draft-ford-MPTCP-multiaddressed-03", Internet Engineering Task Force, Mar. 8, 2010, 35 pp.*

(Continued)

*Primary Examiner* — Michael C Lai
(74) *Attorney, Agent, or Firm* — Myers Bigel & Sibley, P.A.

(57) ABSTRACT

A method and apparatus for handling mobility for a first host with a MPTCP connection to a second host. The first host is identified by a master address that does not change for the duration of the connection, and a plurality of locators. Each locator is associated with a path used in the MPTCP connection. The first host then determines that it has moved, and so obtains new locators. It then sends a first message to a Location Server (LS). The LS maintains an association between the master address and the locators, and the first message includes the new locators. The first host then sends a second message to the second host, the second message including the new locators. The first host can then receive packets sent from the second host sent using the MPTCP connection using the new locators.

8 Claims, 6 Drawing Sheets

(51) Int. Cl.
  *H04L 29/12* (2006.01)
  *H04L 29/06* (2006.01)

(56) References Cited

U.S. PATENT DOCUMENTS

| | | |
|---|---|---|
| 2004/0165538 A1 | 8/2004 | Swami |
| 2004/0179508 A1 | 9/2004 | Thubert et al. |
| 2004/0258021 A1* | 12/2004 | Kashimoto ....... H04L 29/06027 370/331 |
| 2005/0213539 A1* | 9/2005 | Dutta ..................... H04W 8/26 370/331 |
| 2007/0041350 A1* | 2/2007 | Famolari ............... H04L 1/1809 370/338 |
| 2007/0183431 A1* | 8/2007 | Jung ..................... H04W 8/082 370/395.52 |
| 2010/0278099 A1* | 11/2010 | Lee ................... H04L 29/06027 370/328 |
| 2011/0296006 A1* | 12/2011 | Krishnaswamy . H04L 29/12952 709/224 |
| 2012/0144062 A1* | 6/2012 | Livet ....................... H04L 45/24 709/239 |
| 2012/0226802 A1* | 9/2012 | Wu ........................ H04L 1/1825 709/224 |
| 2012/0243441 A1* | 9/2012 | Reunamaki ............. H04L 67/14 370/255 |

FOREIGN PATENT DOCUMENTS

| | | |
|---|---|---|
| CN | 101925125 A | 12/2010 |
| WO | WO 2010/064801 A2 | 6/2010 |

OTHER PUBLICATIONS

International Search Report, PCT/CN2010/002120, Oct. 13, 2011.
Written Opinion of the International Searching Authority, PCT/CN2010/002120, Oct. 13, 2011.
Arkko et al., "Failure Detection and Locator Pair Exploration Protocol for IPv6 Multihoming", Network Working Group, Standard Track, Jun. 2009, 36 pp.
Ford et al., "Architectural Guidelines for Multipath TCP Development, draft-ietf-mptcp-architecture-00", Internet Engineering Task Force, Feb. 28, 2010, 25pp.
Johnson et al., "Mobility Support in IPv6", Network Working Group, Standard Track, Jun. 2004, 165 pp.
Moskowitz et al., "Host Identity Protocol", Network Working Group, Experimental, Apr. 2008, 104 pp.
Tse, "TCP Fairness in Multipath Transport Protocols", submitted to the Department of Computer Science in partial fulfillment of the requirements for the degree of Bachelor of Arts (Honors) in Computer Science at Brown University, May 2006, 45 pp.
Chinese Office Action Corresponding to Application No. 201080070845.8; Date of Issue: Jun. 3, 2015; Foreign Text, 5 Pages, English Translation Thereof, 9 Pages.

* cited by examiner

MOBILITY HANDLING IN A COMMUNICATION NETWORK

CROSS REFERENCE TO RELATED APPLICATION

This application is a 35 U.S.C. §371 national stage application of PCT International Application No. PCT/CN2010/002120, filed on 22 Dec. 2010, the disclosure and content of which is incorporated by reference herein in its entirety. The above-referenced PCT International Application was published in the English language as International Publication No. WO 2012/083495 A1 on 28 Jun. 2012.

TECHNICAL FIELD

The invention relates to the field of mobility handling in a communication network, and in particular to handling mobility for a Multipath Transmission Control Protocol connection.

BACKGROUND

The Transmission Control Protocol (TCP) is a core protocol used in communication networks. It allows data exchange between an application at one host and an application at another host. A limitation of TCP is that although hosts are often connected to one another by multiple paths, TCP restricts communications to a single path for each transport connection. In order to more efficiently use resources within a network, Multipath TCP (MPTCP) is under development, as described in Ford et al, "TCP Extension for Multipath Operation with Multiple Address," draft-ford-mptcp-multi-addressed-03 (Experimental), March 2010 and Ford et al, "Architectural Guidelines for Multipath TCP Development", draft-ietf-mptcp-architecture-00 (Informational), February 2010.

Using MPTCP, hosts that have access to multiple paths can use these for a given TCP connection to exchange data. The simultaneous use of multiple paths for a TCP/IP session improves resource usage within the network, and therefore improves user experience through higher throughput and improved resilience to network failure.

Increasingly, host mobility is commonly required by endpoints. The movement of a host causes a reduction in TCP performance. There are several protocols which have been proposed for handling host mobility management, including Mobile IP (MIP), as described in Johnson et al, "Mobility Support in IPv6", RFC 3775, June 2004, and Host Identity Protocol, as described in Moskowitz et al, "Host Identity Protocol", RFC 5201, April 2008. Most IP protocols that do not provide for host mobility management use an IP address to identify not only the host, but also the topological location of the host. MIP on the other hand separates the host ID and Location using a Home Address (HoA) and a Care of Address (CoA). Host mobility problem is managed by mapping the CoA (which can change as the host moves) to the HoA (which is a permanently or semi-permanently assigned address for the host in its home network). Any applications used to communicate with the host use the HoA for data transmission. In the host's home network, a home agent is introduced for maintaining the mapping between the CoA and the HoA for the host. When a host roams in a foreign network, it registers with the home agent. The home agent captures all the packets sent to the host's HoA and forwards them to the host by tunnelling to the CoA. In this way, even though the host moves and receives a new CoA, the HoA remains the same for the duration of a session and the host can communicate with other hosts.

In a similar manner to MIP, HIP maintains a separate host identity and location information for each mobile node (MN). The Host Identity (HI) name space is to identify the host identity, while the location information, i.e. IP address is used for the purpose of routing. A Rendezvous server (RVS) is provided to maintain a mapping between the HI name space and the current IP address for the MN. The host name, HI, and RVS address are maintained by a Domain Name System (DNS) Server. When another host initiates a connection towards the MN, it first resolves the HI and RVS address, and then sends initialization packets to the RVS. The RVS is responsible for forwarding the packets to MN. If the MN moves, it receives a new IP address and communicates with the RVS to ensure that the RVS has the updated IP address.

MIP and HIP provide solutions for host mobility management, but have shortcomings if a host wishes to use the MPTCP protocol. A problem with MIP is that only one HoA is introduced into the transport layer, whereas MPTCP requires multiple IP addresses to identify each path used for each MPTCP sub-flow. As MIP only assigns one HoA, it cannot support MPTCP.

A problem with HIP is that although it can support several simultaneous transport sessions, it can only do this for different flows. In other words, it could support a TCP connection between email applications for two hosts, and simultaneously support a further TCP connection between Internet applications for two hosts. However, it can not support splitting a TCP session between the email applications of two hosts to use multiple paths for the same TCP connection.

HIP and MIP can handle host mobility management, but they cannot handle host mobility management using MPTCP.

SUMMARY

The inventors have realised the problem with host mobility management using MPTCP. According to a first aspect, there is provided a method of handling mobility for a first host with a MPTCP connection to a second host. The first host is identified by a master address that does not change for the duration of the connection, and a plurality of locators. Each locator is associated with a path used in the MPTCP connection. The first host then determines that it has moved, and so obtains new locators. It then sends a first message to a Location Server (LS). The LS maintains an association between the master address and the locators, and the first message includes the new locators. The first host then sends a second message to the second host, the second message including the new locators. The first host can then receive packets sent from the second host sent using the MPTCP connection using the new locators.

As an option, and prior to determining that the first host has moved, the first host resolves a main address of the second host. A path manager function at the first host intercepts a synchronisation packet destined for the second host, which includes a token identifying the MPTCP connection and a source and destination address. The path manager function resolves locators associated with the second host for use in the MPTCP connection. Paths to use during the MPTCP connection are negotiated, and each path is associated with a locator belonging to the first host and a locator belonging to the second host. The source address in the synchronisation packet is replaced with locators belonging to the first host and the destination address in the synchronisation packet is replaced with the locators belonging to the second host. The synchronisation packet is then sent to the second host.

The method optionally comprises receiving a further message from the second host. The further message includes new locators for the second host as a result of the second host moving. Packets are then sent to the second host packets using the MPTCP connection using the new locators.

According to a second aspect, there is provided a host device for use in a communication network. The host device is identified by a master address that does not change for the duration of a MPTCP connection with a second host device, and a plurality of locators. Each locator is associated with a path used in the MPTCP connection. The host device is provided with a processor for determining that the host has moved and the locators are no longer valid. It is further provided with means for obtaining new locators belonging to the host. A first transmitter is provided for sending a first message to a LS, the LS maintaining an association between the master address and the locators, the first message including the new locators. A second transmitter is provided for sending a second message to the second host, the second message including the new locators. A receiver is also provided for receiving from the second host packets sent using the MPTCP connection using the new locators.

As an option, the host device is provided with an application for resolving a main address of the second host. A path manager function is provided to intercept a synchronisation packet, the synchronisation packet destined for the second host and including a token identifying the MPTCP connection and a source and destination address. The path manager function is also arranged to resolve locators associated with the second host for use in the MPTCP connection. A multi-path negotiating function is provided to negotiate paths to use during the MPTCP connection. An address translation function is provided for associating, with each path, a locator belonging to the host device and a locator belonging to the second host. The address translation function is also arranged to replace the source address in the synchronisation packet and future packets with locators belonging to the host device and the destination address in the synchronisation packet with the locators belonging to the second host. A third transmitter is provided for sending the synchronisation packet to the second host.

According to a third aspect, there is provided a LS for use in a communication network. The LS is provided with a memory for storing, for each of a plurality of host nodes, a master address and a plurality of locators. A receiver is provided for receiving from a first host, prior to establishing a MPTCP connection with a second host, a request containing the master address of the second host. A processor determines the locators associated with the master address for the second host. A transmitter is provided for sending to the first host the locators belonging to the second host.

As an option, the receiver is further arranged to receive from the one of the first and second hosts a plurality of new locators. In this case, the processor is arranged to replace the existing locators stored in the memory with the new locators.

According to a fourth aspect, there is provided a host device for use in a communication network, the host device being able to communicate with a further host device, the further host device being identified by a master address that does not change for the duration of a MPTCP connection with the host device, and a plurality of locators, each locator associated with a path used in the MPTCP. The host device is provided with a memory for storing a plurality of locators, the plurality of locators being associated with the further host. A receiver is provided for receiving from the further host device a message, the message including new locators associated with the further host. A processor is also provided for replacing the association in the memory between the plurality of locators and the further host device with an association in the memory between the new locators and the further host.

According to a fifth aspect, there is provided a computer program that comprises computer readable code means which, when run on a host device, causes the host device to perform a method as described above in the first aspect.

According to a sixth aspect, there is provided a computer program that comprises computer readable code means which, when run on a LS, causes the LS to behave as a LS as described above in third aspect.

According to a seventh aspect, there is provided a computer program product comprising a computer readable medium and a computer program as described above in the fifth and sixth aspects, wherein the computer program is stored on the computer readable medium.

DETAILED DESCRIPTION

For each host, a main identity (MA) is assigned along with several locators. The MA is a globally unique IP address that identifies the MPTCP host. The MA is permanent or semi-permanently assigned (in other words, it will not change for the duration of a MPTCP connection). The MA is not used for routing in network transmission, and only used by the application layer and the transport layer. Locators, on the other hand, are changeable IP addresses obtained from the network in which the host is located. Locators are routable for use in forwarding packets. The provision of several locators allows MPTCP to be used. Note that it is possible for MPTCP to be used where only one host has multiple locators, and the other host uses only a single locator.

For each MPTCP host, a mapping between the MA and the locators is maintained by a Location Server (LS). The mapping between host domain name, MA and LS address is stored in the DNS. Host mobility management relies on dynamic mapping of the MA and the locators.

Figure 1:
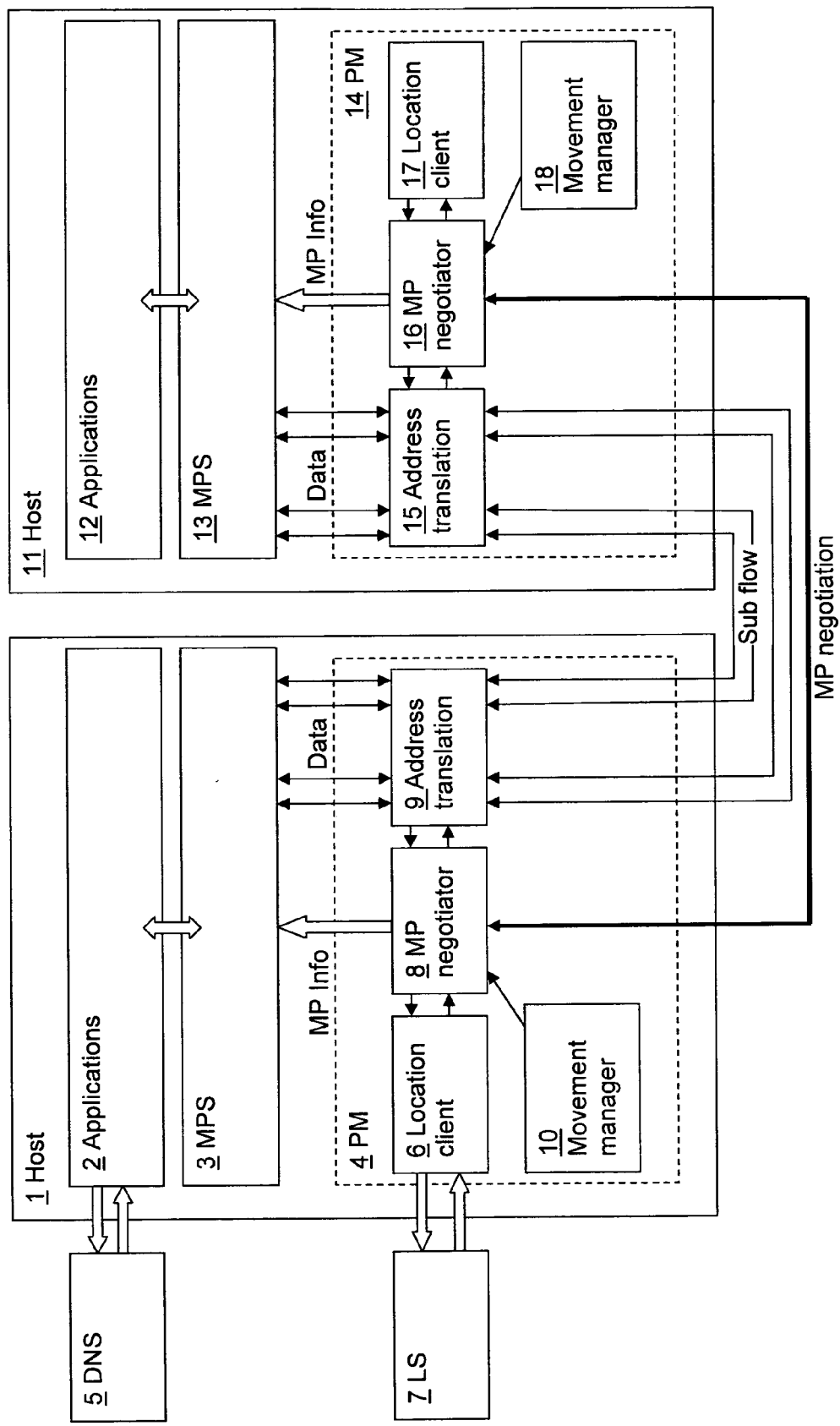
FIG. 1 illustrates schematically in a block diagram a network architecture according to an embodiment of the invention.

Referring to FIG. 1 herein, there is illustrated a network architecture. A first host 1 is provided that has one or more applications 2 that may require the use of MPTCP. A Multi-Path Scheduler (MPS) 3 and a Path Manager (PM) 4 are also provided at the first host 1. The applications 2 can communicate with the DNS 5. The PM 4 comprises a location client 6, which can communicate with the Locations Server 7. The PM 4 also includes a multipath negotiator 8 for negotiating and controlling MPTCP with another host, and address translation function 9 and a movement manager 10.

For completeness, a second host 11 is shown that is also provided with one or more applications 12, a MPS 13, and a PM 14 that comprises an address translation function 15, a multipath negotiator 16, a location client 17 and a movement manager 18.

When the first host 1 wishes to creates a MPTCP connection towards mobile MPTCP second host 11, it first resolves the second host's 11 MA address and LS address using the DNS 5. The PM 4 is responsible for querying the mobile host's 11 locators from the LS 7. Multiple paths, identified by a path index, are negotiated by the MP negotiators 8, 16 of the hosts 1, 11 and notified to the MPS 3 by the PM 4. The MPS 3 creates multiple sub flows via the address translation function 9 according to the negotiated paths. This allows several TCP sub-flows to be exchanged between the address translation functions 9, 15 and passed to the MPS 3, 13 of each host 1, 11. Each MPS 3, 13 can then pass data obtained from the TCP sub-flows to the applications 2, 12 involved in the TCP communication.

In the transport layer, the MA of a mobile host 11 is used as the source and destination addresses and a 6-tuple (sMA, dMA, Protocol, src_port, dst_port, path_index) is used to describe a sub-flow (see Arkko and van Beijum, "Failure Detection and Locator Pair Exploration Protocol for IPv6 Multihoming", RFC 5534, June 2009). For outgoing packets, before the packets are delivered to the IP layer, the PM 4 rewrites the (sMA, dMA) to (sLocator, dLocator) according to the path index. In the reverse direction, packets are rewritten from (sLocator, dLocator) to (sMA, dMA, path_index).

The PM 4, 14 is also responsible for host mobility management, and so the movement manager 10, 18 of each PM 4, 14 ensures that a host 1, 11 updates its locators to the LS 7 in the event that it moves and obtains new locators. The movement manager 10, 18 notifications from an operating system when a configuration between interfaces changes. The movement manager 10, 18 must then decide whether or not the notification is relevant to movement or not. If so, then the movement manager 10, 18 informs notifies other modules about the changes in interface configuration. An example of such a change is a change in IP address. Another example is notification of loss of transmission media (e.g. no wireless coverage, network cable unplugged etc.). When the MP negotiator 8, 16 receives this information from the movement manager 10, 18, it instructs the location client 6, 17 to perform an update and also starts negotiating new locators with the other host. When a locator has changed, it is necessary to perform update in the mapping table between the MA and new locator(s) in order to provide the correct translation for subsequent packets between the hosts (in both directions).

Figure 2:
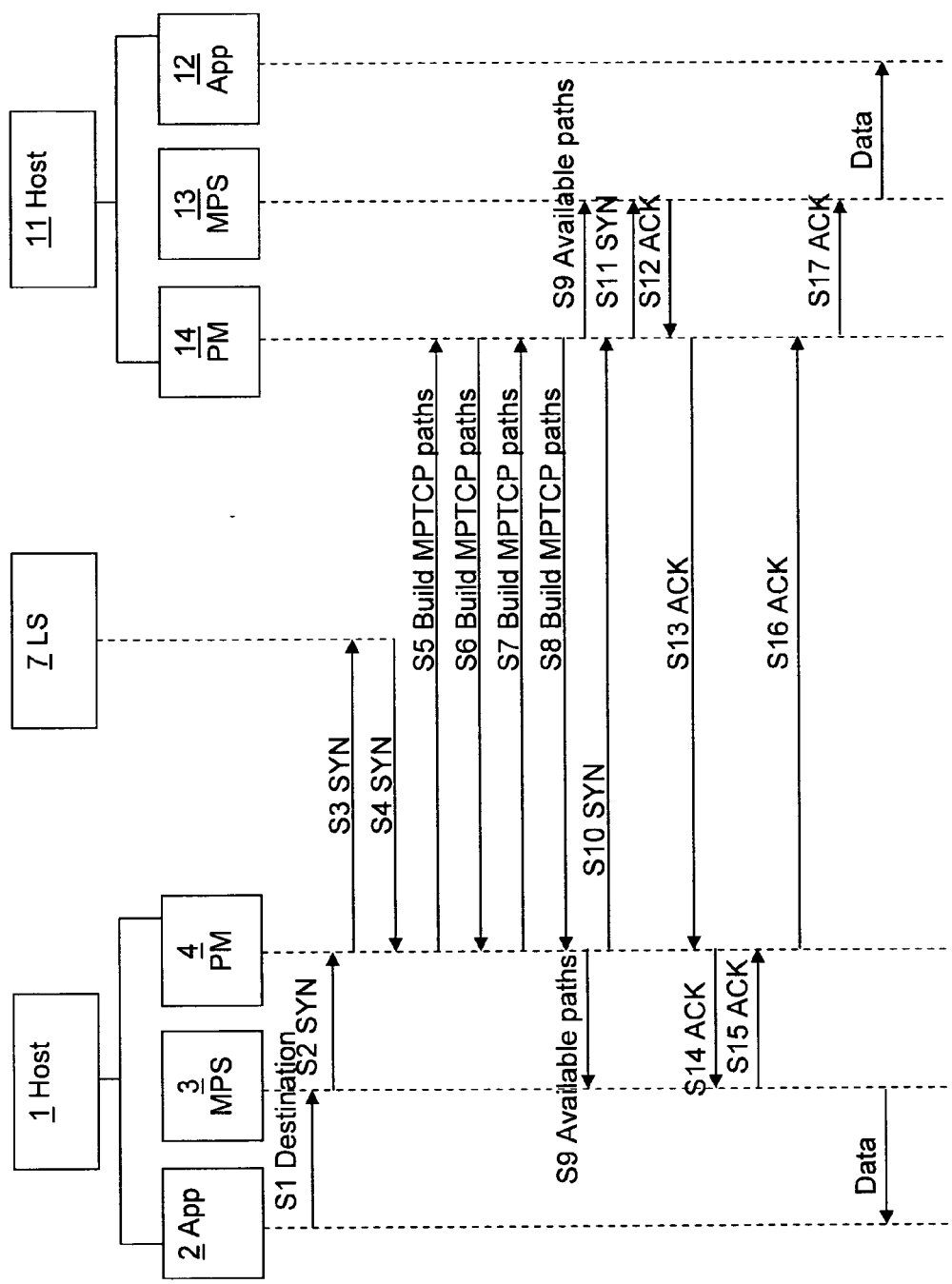
FIG. 2 is a signalling diagram showing signalling required to set up a MPTCP connection according to an embodiment of the invention.

FIG. 2 herein illustrates the steps required to set up a MPTCP connection. The following numbering corresponds to that shown in FIG. 2.

S1. When an application 2 running at the first host 1 wishes to establish a MPTCP connection with the second host 11, it resolves the second host's MA using a DNS query and uses the MA as the destination address for the MPTCP connection. This information is sent to the MPS 3.

S2. The MPS 3 uses a default path to establish a single TCP connection with the second host 11 by sending a synchronize packet (SYN) to initiate a three-way handshake with the second host 11. The source and destination addresses used in the SYN are the MA of the first host 1 and the second host 11. The SYN contains a token to identify the MPTCP connection in a MPC option. The token and Multipath Capable (MPC) option are described in detail in Ford et al, "TCP Extension for Multipath Operation with Multiple Address," draft-ford-mptcp-multiaddressed-03 (Experimental), March 2010. In summary, the MPC option declares that the first host is capable of MPTCP and wishes to use MPTCP for this connection. The token is a locally unique token used to identity the connection, and can be used to add sub-flows to the connection. Note that the token is unique for the first host 1. The MTCP operations are signalled using TCP header fields.

S3-S4. The PM 4 intercepts the SYN packet before it is sent to the IP layer and on to the second host 11. The PM 4 first checks to determine if it has already recorded this particular MPTCP connection using the token in the MPC option, and if there is no existing record for this the connection the PM 4 records it. The PM then resolves the locators of the second host 11 using the LS 7 and, using the locators, initiates a multipath negotiation process.

S5-S8. The PM 4 of the first host 1 initiates a four-way handshake with the PM 14 of the second host 11 for exchanging the locators used to build multiple paths for the MPTCP connection with the second host 11.

S9. Once the path negotiation process is complete, the available multiple paths are announced to the MPS 3, 13 of each of the first host 1 and the second host 11. A path is simply a sequence of links between a sender and a receiver (the hosts in this case) and, in this context, is denoted by a locator pair of locators for the first host 1 and the second host 11.

S10. The PM 4 maps the locators to the MA of the second host 11 and rewrites the source and destination address of the SYN packets from the MA to locators according to the path index. The PM 4 then sends the SYN to the IP layer for forwarding to the second host 11.

S11. The PM 14 of the second host 11 intercepts the SYN packet from the first host 1 and rewrites the source and destination address using the MAs of the first host 1 and the second host 11. The SYN is then forwarded to the MPS for further handling.

Figure 3:
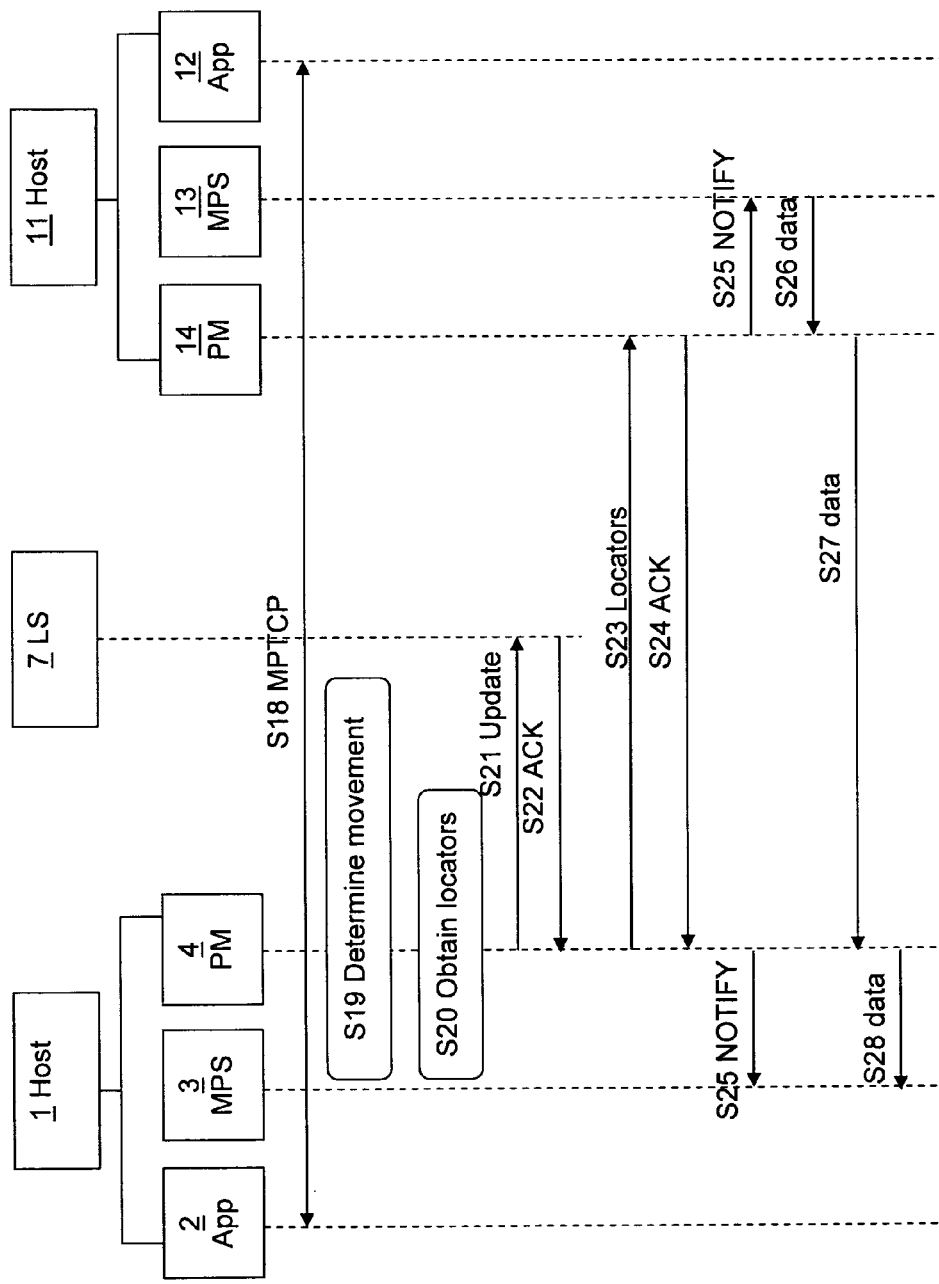
FIG. 3 is a signalling diagram showing signalling when one host moves during an ongoing MPTCP connection according to an embodiment of the invention.

S12-S17. The second host 11 sends back the SYN and ACK to accept the MPTCP request of the first host 1, and it send ACKs to finish the three-way handshake Once this has been completed, the hosts 1, 11 can exchange data using the MCTCP connection Turning now to FIG. 3, the steps are illustrated according to an embodiment of the invention in which the first host changes location. The following numbering corresponds to the numbering of FIG. 3.

S18. The MCTCP connection is established between the first host 1 and the second host 11.

S19. The PM 4 of the first host 1 determines that the first host 1 has moved. One way of making such a determination is for an operating system to use an Application Programming Interface (API) for notifying the PM 4 of the changes.

S20. The PM 4 then obtains new locators, although the MA of the first host 1 remains unchanged.

S21-S22. After obtaining the new locators, the PM 4 sends a message to the LS 7 to update the locators. In step S22, the LS 7 acknowledges receipt of the new locators. New locators may be obtained either by movement detection along with the notification about the change in interface configuration, or by using the change in interface configuration to trigger the PM 4 to obtain the locators.

S23-S24. The PM 4 sends the new locators to the second host 11. The second host 11, in step S24, acknowledges that it has received the new locators.

S25. The PM 4 of the first host 11 and the PM 14 of the second host 11 notify the respective MPS 3, 13 if any links between them are unavailable.

S26-S28. All of the packets sent to the first host 1 now use the first host's 1 new locators, allowing the MPTCP connection to be maintained using the new locators even though the first host has moved.

Figure 4:
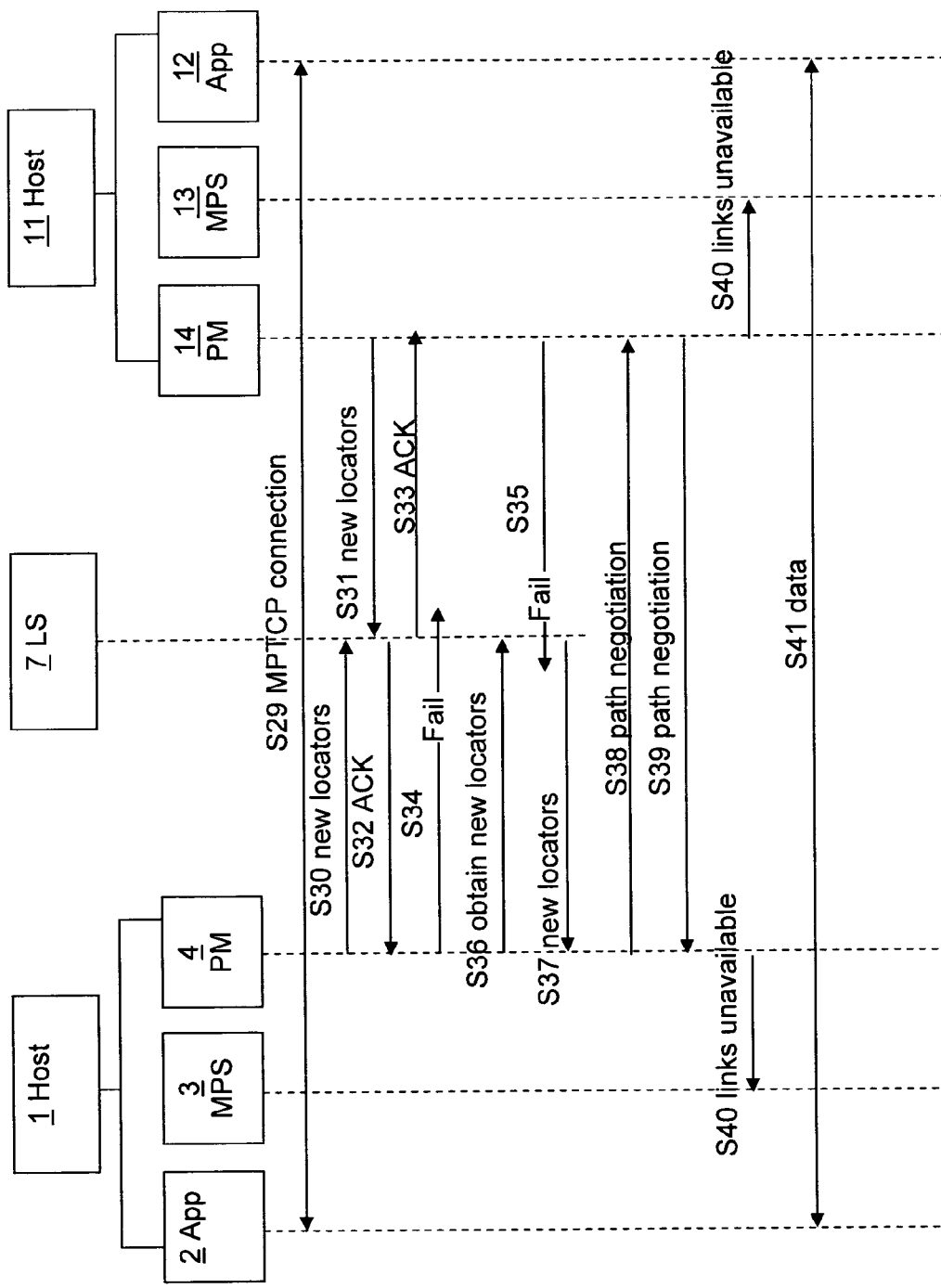
FIG. 4 is a signalling diagram showing signalling when both hosts move during an ongoing MPTCP connection according to an embodiment of the invention.

Referring now to FIG. 4, there is illustrated the signalling according to an embodiment of the invention in which both the first host 1 and the second host 11 move and require new locators. The following numbering corresponds to the numbering of FIG. 4.

S29. While data is exchanged using the MPTCP connection between the first host 1 and the second host 11, the PMs 4, 14 of the first host 1 and the second host 11 monitoring any movements of the hosts.

S30-S33. The PMs 4, 14 determine that each of the first host 1 and the second host 11 have moved. Each PM 4, 14 sends a message to the LS 7 to update the LS 7 with the new locators.

S34-S35. The PMs 4, 14 of each of the first host 1 and the second host 11 fail to notify their new locators to each other for the obsolete locators they own, as each host moves simultaneously. Both hosts therefore change their locators simultaneously, and so both hosts need to query the location server for the locators for the other host.

S36-S37. The PM 4 of the first host 1 queries the LS 7 to obtain the new locators of the second host 11. Similarly, the second host 11 must obtain new locators for the first host 1.

S38-S39. After getting the new locators, the negotiation of multiple paths between first host 1 and second host 11 is performed in steps S38 and S39.

S40. The PMs 4, 14 of each of the first host 1 and the second host 11 notify the respective MPS 3, 13 if some links between them are unavailable.

S41. The data packets sent using the MPTCP connection use the new locators of the first host 1 and the second host 11.

Figure 5:
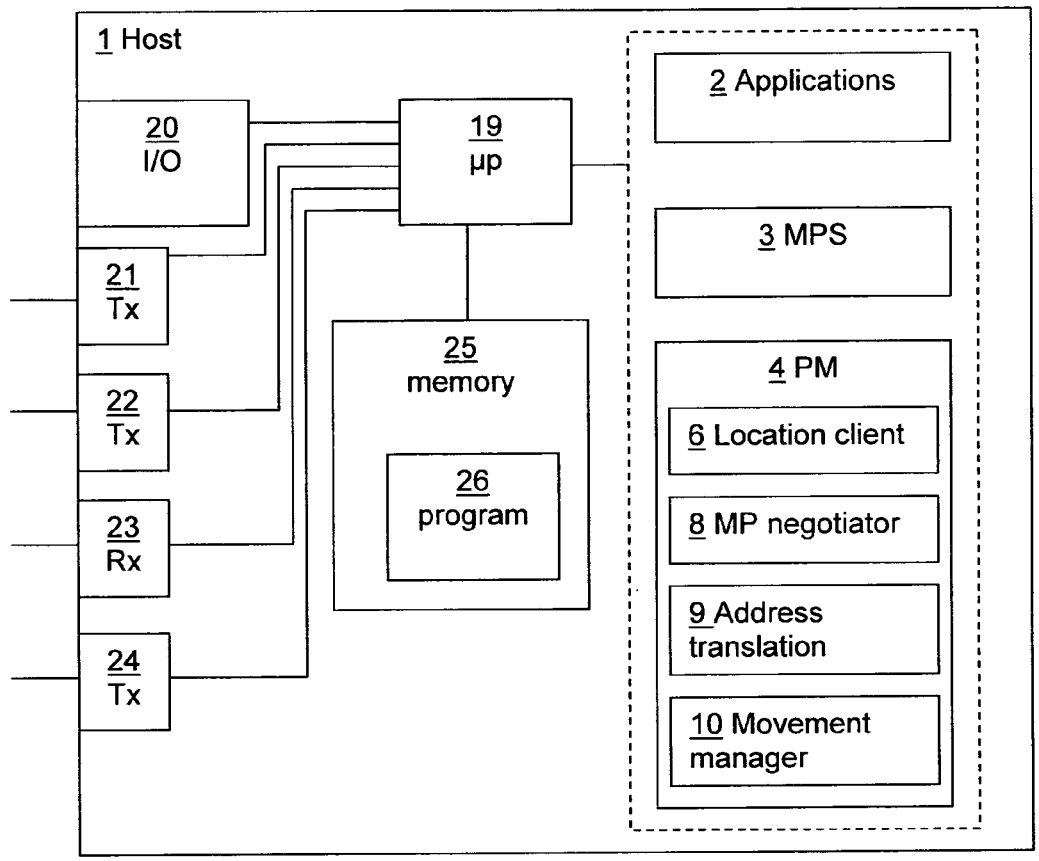
FIG. 5 illustrates schematically in a block diagram a host device according to an embodiment of the invention.

Referring now to FIG. 5, there is illustrated the first host 1 by way of example. The host 1 is provided with a processor 19 which determines when the host 1 has moved. Once the host has moved, new locators are required, and so means 20 are provided for obtaining new locators. A first transmitter 21 is provided for sending a first message that includes the new locators to the LS 7, and a second transmitter 22 is provided for sending a message including the new locators to the second host 11. A receiver 23 is also provided for packets sent from the second host 11 using the MPTCP connection.

As described above, the host is also provided with functions that may be implemented using either hardware or software. These include the applications 2 which, among other things, resolves a main address of the second host, the path manager function 4, the multipath negotiating function 8 arranged to negotiate paths to use during the Multipath Transmission Control Protocol connection, the address translation function 9, the movement manager 10 and the MPS 3.

The first host 1 may also be provided with a third transmitter 24 for sending SYN to the second host 2. A computer readable medium in the form of a memory 25 may also be provided which may be used to store a program which, when executed by the processor, causes the first host 1 to behave as described above and implement the functions necessary to support mobility for a MPTCP connection.

Figure 6:
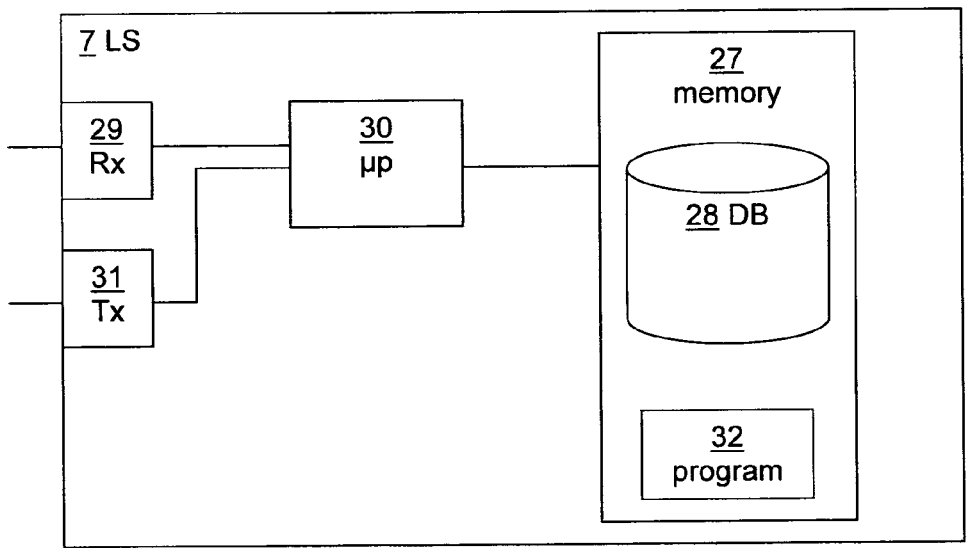
FIG. 6 illustrates schematically in a block diagram a Location Server according to an embodiment of the invention.

Referring now to FIG. 6, there is illustrated a LS 7. The LS 7 is provided with a computer readable medium in the from of a memory 27 for storing the master address and a plurality of locators (for example, in a database 28) for each host served by the LS 7. A receiver 29 is provided for receiving a request from the first host 1. The request includes the MA of the second host 11. A processor 30 is provided for determining the locators associated with the MA for the second host 11, and a transmitter 31 is provided for sending to the locators belonging to the second host 11 to the first host 1. The receiver 29 may also be arranged to receive, from the second host 11, a plurality of new locators, and the processor 31 may be arranged to replace the existing locators stored in the memory 27 with the new locators.

The memory 27 may also be used to store a program 32 which, when executed by the processor 30, causes the LS 7 to behave as described above and implement the functions necessary to support mobility for a MPTCP connection.

Figure 7:
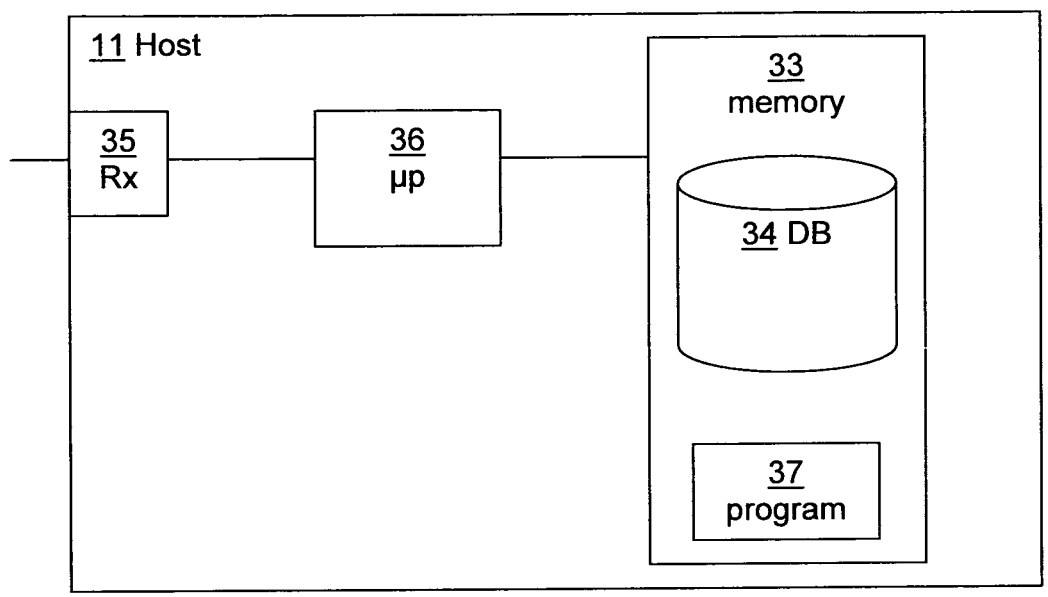
FIG. 7 illustrates schematically in a block diagram a host device according to a further embodiment of the invention.

Turning now to FIG. 7, there is illustrated a host device 11 that receives new locators as described above. The host device is provided with a computer readable medium in the form of a memory 33. The memory contains a database 34 or other data structure used to store an association between the host 1 and its locators. A receiver 35 receives a message that contains the new locators, and a processor 35 updates the database 34 to replace the previous locators associated with the host 1 with the new locators.

The memory 33 may also be used to store a program 37 which, when executed by the processor 36, causes the host 11 to behave as described above and implement the functions necessary to support mobility for a MPTCP connection.

The invention provides mobility handling for hosts when using a MPTCP connection. An advantage of using an end-to-end protocol based on MPTCP is that it has great tolerance in the event of dealing with network faults or breakages. For example, if a path fails because of host movement, the MPS can temporarily send packets from other paths. A further advantage of the present invention is that the only intermediate node required is the location server, and so it does not existing routers and stations in the network do not require modification. This makes the invention easy to deploy in existing networks.

It will be appreciated by the person of skill in the art that various modifications may be made to the above described embodiments without departing from the scope of the present invention as defined in the appended claims.

The following acronyms have been used in this description:
ACK Acknowledgement
API Application Programming Interface
CoA Care-of Address
DNS Domain Name System
HI Host Identity
HIP Host Identity Protocol
HoA Home Address
LS Location Server
MA Main Address
MIP Mobile IP Protocol
MN Mobile Node
MPS Multipath Scheduler
MPTCP Multi-Path TCP
PM Path Manager
RVS Rendezvous server
SYN Synchronize packet

The invention claimed is:
1. A method of handling mobility for a first host with a Multipath Transmission Control Protocol connection to a second host, the method comprising:
resolving, at the first host, a main address of the second host,
determining that the first host has moved, the first host being identified by a main address of the first host that does not change for the duration of the connection, and a plurality of locators, each of the locators associated with a path used in the Multipath Transmission Control Protocol connection, at a path manager function at the first host, intercepting a synchronisation packet, the synchronisation packet destined for the second host and including a token identifying the Multipath Transmission Control Protocol connection and a source address and a destination address;

at the path manager function, resolving locators associated with the second host for use in the Multipath Transmission Control Protocol connection;

at the path manager function, negotiating paths to use during the Multipath Transmission Control Protocol connection, and associating, for each path, a locator belonging to the first host with a locator belonging to the second host;

at the path manager function, replacing the source address in the synchronisation packet with locators belonging to the first host and the destination address in the synchronisation packet with the locators belonging to the second host;

sending the synchronization packet to the second host;

at the first host, obtaining new locators;

sending, by the first host, a first message to a Location Server, the Location Server maintaining an association between the main address of the first host and the locators, the first message including the new locators;

sending, by the first host, a second message to the second host, the second message including the new locators; and receiving, by the first host, from the second host packets sent using the Multipath Transmission Control Protocol connection using the new locators.

2. The method according to claim 1, further comprising:

receiving from the second host a further message, the further message including new locators for the second host as a result of the second host moving; and sending to the second host packets sent using the Multipath Transmission Control Protocol connection using the new locators included in the further message.

3. A computer program product, comprising computer readable code stored in a non-transitory computer readable medium, the computer readable code, when run on a host device comprising a processor, causes the processor to perform the method as claimed in claim 1.

4. The method according to claim 1, wherein the main address of the first host comprises a globally unique Internet Protocol (IP) address identifying the first host.

5. The method according to claim 1, wherein the locators are changeable Internet Protocol (IP) addresses obtained from a network in which the first host is located.

6. A host device for use in a communication network, the host device being identified by a main address that does not change for the duration of a Multipath Transmission Control Protocol connection with a second host device, and a plurality of locators, each of the locators associated with a path used in the Multipath Transmission Control Protocol connection, the host device comprising:

a processor configured to determine that the host device has moved and the locators are no longer valid;

circuitry configured to obtain new locators belonging to the host device;

a first transmitter configured to send a first message to a Location Server, the Location Server maintaining an association between the main address and the locators, the first message including the new locators;

a second transmitter configured to send a second message to the second host device, the second message including the new locators;

a receiver configured to receive, from the second host device, packets sent using the Multipath Transmission Control Protocol connection using the new locators;

an application configured to resolve a main address of the second host device;

a path manager function configured to intercept a synchronisation packet, the synchronisation packet destined for the second host device and including a token identifying the Multipath Transmission Control Protocol connection and a source address and a destination address;

the path manager function being further configured to resolve locators associated with the second host device for use in the Multipath Transmission Control Protocol connection;

a multipath negotiating the Multipath Transmission Control Protocol connection, an address translation function configured t e associate for each path a locator belonging to the host device with a locator belonging to the second host device;

the address translation function being further configured to replace the source address in the synchronisation packet and future packets with locators belonging to the host device and the destination address in the synchronisation packet with the locators belonging to the second host device; and a third transmitter configured to send the synchronisation packet to the second host device.

7. The host device according to claim 6, wherein the main address of the host device comprises a globally unique Internet Protocol (IP) address identifying the host device.

8. The host device according to claim 6, wherein the locators are changeable Internet Protocol (IP) addresses obtained from a network in which the host device is located.

* * * * *

UNITED STATES PATENT AND TRADEMARK OFFICE
CERTIFICATE OF CORRECTION

PATENT NO. : 9,294,548 B2
APPLICATION NO. : 13/995745
DATED : March 22, 2016
INVENTOR(S) : Cui et al.

Page 1 of 1

It is certified that error appears in the above-identified patent and that said Letters Patent is hereby corrected as shown below:

Title Page Item 74, under "Attorney, Agent, or Firm", in Column 2, Line 1, delete "Myers Bigel & Sibley, P.A." and insert -- Myers Bigel Sibley & Sajovec, P.A. --, therefor.

In the Specification

In Column 4, Line 43, delete "identity" and insert -- Address --, therefor.

In Column 6, Line 6, delete "identity" and insert -- identify --, therefor.

In Column 7, Line 61, delete "from of" and insert -- form of --, therefor.

In the Claims

In Column 9, Line 3, in Claim 1, delete "connection," and insert -- connection; --, therefor.

In Column 10, Line 33, in Claim 6, delete "negotiating" and insert -- negotiating function configured to negotiate paths to use during --, therefor.

In Column 10, Lines 35-36, in Claim 6, delete "t e associate for each path" and insert -- to associate, for each path, --, therefor.

Signed and Sealed this
Twelfth Day of July, 2016

Michelle K. Lee
*Director of the United States Patent and Trademark Office*